United States Patent Office 3,260,827
Patented July 12, 1966

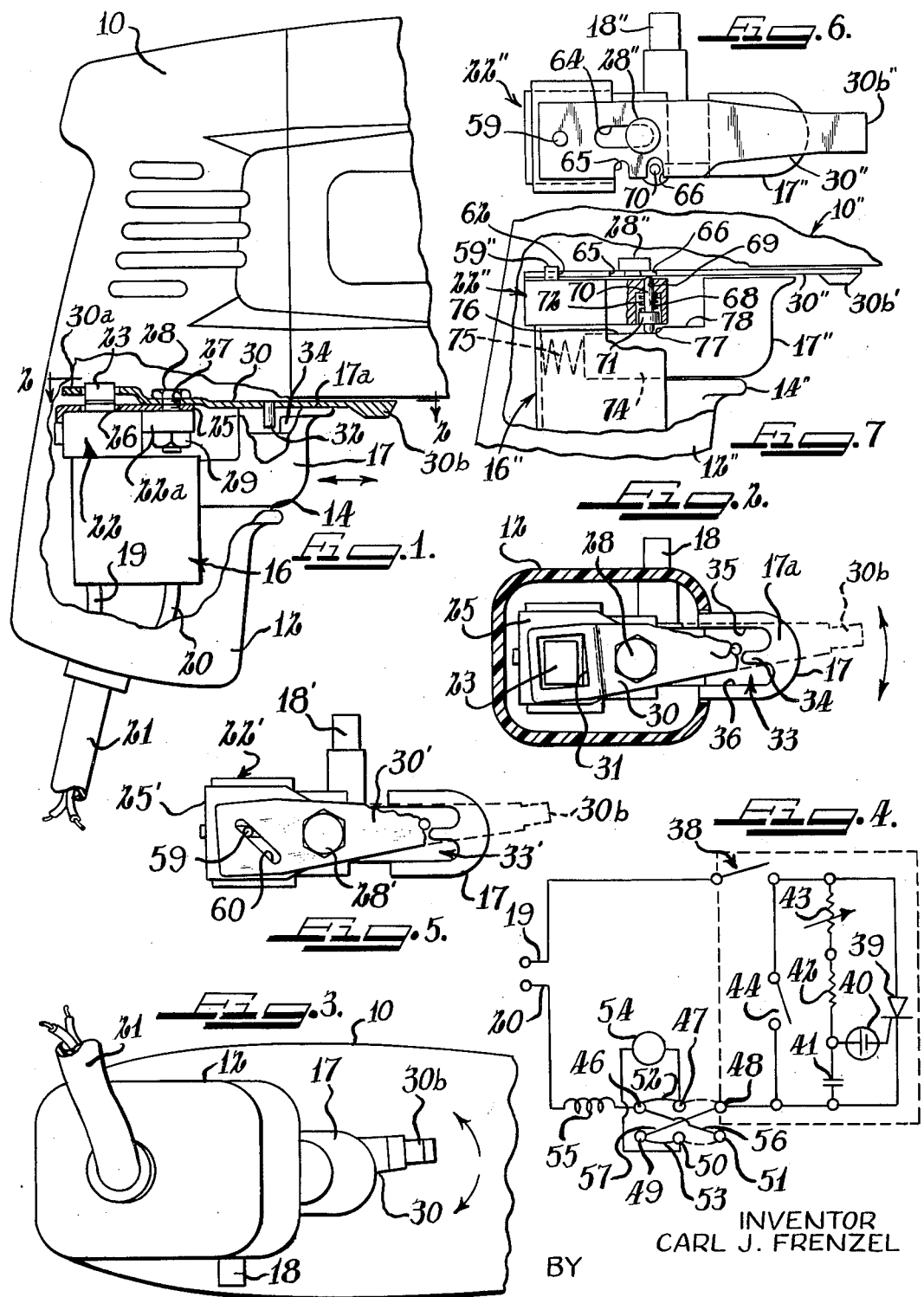

3,260,827
MOTOR REVERSING MECHANISM FOR ELECTRICALLY POWERED PORTABLE TOOLS
Carl John Frenzel, Chicago, Ill., assignor to Skil Corporation, Chicago, Ill., a corporation of Delaware
Filed July 12, 1965, Ser. No. 471,289
10 Claims. (Cl. 200—157)

This invention relates to electrically powered portable tools, and more particularly to new and improved means for reversing the direction of rotation of the electric motors in such tools.

The primary object of the present invention is to provide in an electrically driven power tool having an operating trigger, a reversing mechanism including a reversing switch and an operating lever therefor, which operating lever has a portion thereof uniquely arranged in relation to the tool trigger so that a person's finger operating the trigger may at the same time engage the operating lever for ready operation thereof.

Another object of the present invention is to provide in an electrically driven power tool having an operating trigger, a reversing mechanism including a reversing switch and an operating lever therefor, which mechanism further includes novel interlock means preventing movement of the operating lever except when the trigger is fully extended and thereby insuring against actuation of the reversing switch while the motor is energized.

These and other objects and advantages will become apparent from the following specification disclosing a preferred embodiment of the invention which is illustrated in the accompanying drawings wherein:

FIG. 1 is a side elevation of a portable electric tool embodying the present invention and showing a portion of the tool housing broken away for better illustration of the invention;

FIG. 2 is a section taken along line 2—2 of FIG. 1;

FIG. 3 is a fragmentary bottom plan view of the power tool of FIG. 1;

FIG. 4 is a schematic view of an electrical circuit which may be used in association with the present invention;

FIG. 5 is a section similar to FIG. 2 but showing a modified form of the invention;

FIG. 6 is a section similar to FIG. 2 but showing a further modified form of the invention; and FIG. 7 is a side elevation of the form of the invention illustrated in FIG. 6 showing the same mounted in the handle of a power tool.

FIG. 1 illustrates a power tool in which the present invention may be incorporated. The power tool shown for purposes of illustration is in the form of a portable electric drill including a housing 10 enclosing a suitable reversible electric motor (not shown). The motor is connected with a conventional tool spindle (not illustrated), which spindle 11 is adapted for detachable engagement with a working tool, such as a drill bit, in a manner well known in the art. Housing 10 includes a depending pistol grip portion 12 having a forwardly facing opening 14.

The power drill will be seen to mount a speed control switch unit 16 within pistol grip handle portion 12. The casing of unit 16 slidably supports a trigger 17 for reciprocal movement as indicated by the arrows in FIG. 1. It will be understood that unit 16 includes a suitable spring constantly urging trigger 17 outwardly (to the right as viewed in FIG. 1) to its fully extended or off position. Unit 16 may also include an appropriate locking mechanism including a pin 18 (FIGS. 2 and 3) for locking the trigger in its fully in or on position. As noted in FIG. 1, trigger 17 extends through opening 14 in handle portion 12 of the tool housing. Electrical leads 19 and 20 extend from unit 16 and form part of an electrical cord 21 which is suitably connected to the handle portion 12 of the drill. It will be understood that switch unit 16 of itself forms no part of the present invention.

The present invention has to do with a reversing switch 22 and the means for operating or actuating the same. This switch is suitably secured on switch unit 16. Reversing switch 22, which of itself may be of known construction, includes a switch button 23. In the embodiment illustrated, switch button 23 is adapted to be moved laterally of the direction of trigger movement for actuating the reversing switch.

Reversing switch 22 mounts a bracket plate 25 which extends forwardly of switch 22 over an extension 22a thereof. Bracket plate 25 includes an aperture 26 for permitting movement of button 23. Bracket plate 25 also includes another aperture 27 mounting a small bolt 28 which extends through a suitable bore in extension 22a and threadingly engages a nut 29. A reversing switch operating lever 30 is pivotally mounted intermediate the ends thereof by bolt 28.

Operating lever 30 has a raised end portion 30a with a rectangular opening 31 loosely engaging switch button 23. The other end of operating lever 30 extends over an upper horizontal surface 17a of the trigger and extends exteriorly of the housing through opening 14 therein. A formation 30b is integrally formed on the exposed end of operating lever 30. Operating lever 30 further includes a depending pin 32.

Trigger 17 includes a cavity 33 opening upwardly into surface 17a thereof. As noted in FIG. 2, cavity 33 may be characterized as having a horizontal cross section of U shape. The trigger includes an integral partition 34 extending rearwardly of the front wall of the cavity in parallel, equidistant relation with side walls 35 and 36 thereof. The rear of cavity 33 may be closed or it may open rearwardly of the upstanding portion of the trigger as is the case with the embodiment shown for purposes of illustration. Pin 32 depending from lever 30 is received within cavity 33.

The actuating lever must be moved to one side or the other of the trigger to permit squeezing or rearward movement of the trigger. Otherwise, pin 32 is engaged by partition 34 thereby preventing rearward movement of the trigger. After initial squeezing of rearward movement of the trigger, pin 32 is received to one side or the other of partition 34 and therefore the operating lever 30 may not be moved after this initial rearward movement of the trigger. The purpose of this feature will be set forth hereinbelow.

A circuit with which the present invention may be used is illustrated schematically in FIG. 4. The portion of the circuit shown within the broken line in this figure is a trigger operated, variable speed, silicon controlled rectifier type circuit which is substantially the same as the circuit shown in copending Gawron application, Serial No. 226,956, filed September 28, 1962. This circuit will be seen to include an on-off switch 38 connected in one of the lines of the A.C. power source. The circuit further includes a silicon controlled rectifier 39 having the gate thereof connected with a neon bulb 40. The neon bulb is also connected to a terminal interposed between a capacitor 41 and a fixed resistor 42, which fixed resistor is in series circuit relation with a variable resistor 43. The variable resistor is connected in a line extending to the anode of the silicon controlled rectifier, and the capacitor is connected in a line extending to the cathode of silicon controlled rectifier 39. A bypass line including a bypass switch 44 is provided for shunting the silicon controlled rectifier, the resistors, and the capacitor. As disclosed in the aforesaid Gawron application, the movable element of variable resistor 43 and bypass switch 44 are both connected with a tool trigger thereby to provide variable speed control by manipulation of the trigger and to provide full wave or maximum speed operation when the trigger is fully depressed. Preferably, on-off switch 38 is also connected with the trigger for closing upon initial squeezing or depressing of the trigger. It will be understood that the circuit just described forms no part of the present invention.

Reversing switch 22 may consist of terminals 46 through 51 and movable contacts represented by arcuate lines 52 and 53. Armature 54 of the motor within tool 10 is connected between switch terminals 47 and 50; field windings 55 of the motor are connected between switch terminal 46 and lead 20 from the A.C. source. A line 56 connects switch terminals 46 and 51, and a line 57 connects switch terminals 48 and 49. By tracing the circuit illustrated in FIG. 4, it will be seen that current will flow in one direction through the armature and windings of the motor when movable contacts 52 and 53 are in the solid line position illustrated, and that current will flow in an opposite direction through the armature and field windings when movable contacts 52 and 53 are in the broken line position illustrated.

It will be understood that when button 23 of the reversing switch is moved to one position thereof by swinging formation 30b of lever 30 to one side of the trigger as indicated by the arrows in FIGS. 2 and 3, movable contacts 52, 53 are in one position and the tool motor will therefor operate in one direction, and that when formation 30b is swung to the other side of the trigger for moving switch button 23 to its other position, contacts 52, 53 are moved to their other position and the electric motor of the tool will then be operated in the opposite direction upon squeezing of the trigger. Because of the interlock defined by pin 32 and cavity 33 in the trigger, lever 30 may be operated only when the trigger is fully extended, i.e. in the off position. This feature prevents operation of reversing switch 22 when the tool motor is being energized. It will be realized that damage to the motor and/or electric components associated therewith would be likely if the reversing switch was operated while the motor was energized and operating, especially at a high speed.

It will be appreciated that by the arrangement of formation 30b on reversing lever 30 with respect to trigger 17, an operator's finger engaging the trigger may at the same time also engage formation 30b for operating the reversing switch. Therefore, the direction of rotation of the electric motor can readily be changed by releasing finger pressure on the trigger thereby to extend the same fully, and then by moving formation 30b to the other side of the trigger whereupon squeezing of the trigger will cause the motor to be rotated in an opposite direction. Accordingly, the operator may use his trigger finger for reversing the direction of rotation without at any time losing control over the tool trigger.

A modification of the invention is illustrated in FIG. 5. The parts of the modified invention which conform to the embodiment of the invention described above are indicated by the prime form of numeral. The modified form of the invention differs in that the reversing switch includes an actuating member or button 59 which is movable in a direction parallel with the direction of trigger movement. In order to provide this movement of button 59 upon swinging of reversing lever 30', the latter is provided with an inclined slot 60 which receives switch 59. It will be apparent that when formation 30b' is swung to one side of the trigger, e.g. the broken line position illustrated in FIG. 5, switch button 59 will be slid rearwardly. Of course, when formation 30b' is swung to the other side of the trigger, switch button 59 will be slid forwardly.

A further modification of the invention is illustrated in FIGS. 6 and 7. The parts of the modified invention shown in these two figures which conform to the embodiment of the invention described in FIGS. 1 through 4 are indicated by the double prime form of numeral. The FIG. 6 and FIG. 7 modification differs from the forms of the invention described above mainly in that the reversing lever is reciprocated in the same direction as the trigger as opposed to being swung from one side to the other of the latter.

Reversing switch 22" includes a button 59" which is movable between its two positions in a direction parallel with the direction of trigger movement. Reversing lever 30" includes an aperture 62 in which button 59" is received. Reversing lever 30" also includes a longitudinally elongated slot 64 which slidably receives the shank of bolt 28" adjacent the head of the latter. Bolt 28" in cooperation with button 59" mounts reversing lever 30" for reciprocal movement in a direction parallel to the direction of movement of trigger 17". Reversing lever 30" is further defined by a pair of recesses or openings 65 and 66 formed in spaced relation along one side of the lever.

Switch unit 16" includes suitable structure defining a vertically extending bore 68, which bore communicates at its upper end with a coaxially arranged, reduced-in-diameter bore 69. This last mentioned bore opens at the top of switch unit 16". A pin 70 is disposed within bores 68 and 69; the upper end of the pin extends into bore 69 in slidable engagement therewith. Pin 70 includes an integral collar 71. A coil spring 72 is disposed within bore 68 in encircling relation with pin 70. One end of the spring abuts the upper surface of collar 71 and the other end of the spring abuts the upper end of bore 68. Spring 72 acts to urge pin 70 downwardly.

Trigger 17" includes an integral, rearwardly extending portion 74 which is slidably mounted in switch unit 16" by suitable means, such as tracks or guideways (not shown). In other words, trigger portion 74 is slidably mounted in switch unit 16" thereby to mount trigger 17" for reciprocal movement. A spring 75 has one end thereof in abutting engagement with the rear end of trigger portion 74 and the other end thereof in abutting engagement with a rear wall portion of switch 16". Spring 75 acts to urge the trigger forwardly to its off position; suitable stop means (not shown) are provided to limit outward movement of the trigger. Trigger portion 74 includes an upper, horizontally disposed, flat surface 76. This surface merges with an inclined surface 77, which surface in turn joins or merges with a horizontally disposed, flat trigger surface 78.

When trigger 17" is in its forwardmost or off position, the lower end of pin 71, which is suitably rounded, is engaged by trigger surface 76. When the trigger is pulled inwardly for energizing the motor of the tool, trigger surface 77 cams pin 70 upwardly until the lower end of pin 71 is engaged by trigger surface 78, whereupon pin 70 is held in its upper position upon continued rearward movement of the trigger. When pin 70 is cammed upwardly as just explained, the upper end thereof enters either recess 65 or recess 66 in reversing lever 30". At this time it should be explained that when reversing lever 30" is in its rearwardmost position, recess 66 is arranged over pin 70, and when reversing lever 30" is in its forwardmost position, recess 65 is positioned over pin 70.

Reversing lever 30" of course controls the direction of rotation to be given to the motor. After lever 30" is located in either of its positions, and after the trigger is pulled inwardly for energizing the motor, it will be apparent that the reversing lever may not be moved because of the engagement of the upper end of pin 70 in either of the recesses 65, 66 in reversing lever 30". Accordingly, reversing lever 30" may be moved for changing the direction of rotation of the motor only when the trigger is in its forwardmost position in which case the tool motor will be de-energized.

It should be understood that the invention is not to be limited to any particular form of reversing switch. Reversing lever 30 can be adapted to accommodate other reversing switches of known type. Further, it will be understood that the present invention is not to be limited for use in association with a trigger speed control circuit, such as the circuit illustrated herein and disclosed in the aforementioned Gawron application. The reversing mechanism of the present invention can be used in association with a trigger which merely controls an on-off switch and does not provide variable speed control.

While the invention has been illustrated in only a few forms, it will be understood that it is not to be so limited. On the contrary, the invention is susceptible of various forms and modifications without departing from the spirit and scope of the appended claims.

I claim:

1. In a hand-manipulatable power tool of the type including a housing enclosing a reversible electric motor, a trigger mounted from the housing and connected with the tool motor for energizing the same upon squeezing of the trigger by a person's finger, the improvement comprising, a reversing mechanism including a reversing lever mounted in said housing for movement between two opposite positions, which lever has one end thereof extending exteriorly of said housing and disposed closely adjacent said trigger generally above and forwardly of the same so that a person's finger may simultaneously engage said trigger and said one end of the lever for moving the same between said two positions, said reversing mechanism further including reversing switch means in said housing and connected with said motor for reversing the direction of rotation thereof, said lever being connected with said reversing switch means for operation of the latter upon movement of the former between said two positions.

2. The improvement according to claim 1 further defined by, said lever being pivotally supported intermediate the ends thereof thereby mounting said one end of the lever for swinging movement between said two positions generally transversely to said trigger, said lever having the other end thereof connected with said reversing switch means, a pin depending from said lever and supported from the latter adjacent said one end thereof, said trigger including an upwardly opening recess having a generally U-shaped horizontal cross-section with the legs of the U extending generally parallel with the direction of trigger movement and with the bight portion of the U being nearer the rear of the trigger than the legs of the U, said pin being received within said recess and arranged to enter the bight portion of the U only when the trigger is substantially fully extended.

3. The improvement according to claim 1 further defined by, said lever being pivotally supported intermediate the ends thereof thereby mounting said one end of the lever for swinging movement between said two positions generally tranversely to the trigger, said lever having the other end thereof connected with said reversing switch means, a pin depending from said lever and supported from the latter adjacent said one end thereof, said trigger including an upwardly opening cavity having spaced side walls extending generally parallel with the direction of trigger movement and having a front end wall extending between said side walls, said trigger including a partition in said cavity, which partition extends from said front end wall in parallel equidistant relation with said side walls, said pin being received in said cavity and being arranged and adapted to pass from one side of said partition to the other side thereof when said trigger is fully extended.

4. In a hand-manipulatable power tool of the type including a housing enclosing a reversible electric motor, a trigger mounted from the housing and connected with the tool motor for energizing the same upon squeezing of the trigger by a person's finger, the improvement comprising, a reversing lever mounted by said housing for longitudinal reciprocal movement between two positions, which lever has one end thereof extending exteriorly of said housing and disposed closely adjacent said trigger so that a person's finger engaging said trigger may at the same time also engage said one end of the lever for moving the same, a two-position reversing switch in said housing and connected with said motor for reversing the direction of rotation thereof, said lever having the other end thereof connected with said reversing switch for moving the latter between its two positions upon corresponding movement of the lever, said lever having a pair of separate means spaced generally along the length thereof, a pin movably mounted adjacent said lever and arranged to have one end thereof engage either of said means for locking said lever against movement, which means are arranged so that when said lever is in one of its positions one of said means is disposed adjacent said one end of the pin and so that when said lever is in the other of its positions the other of said means is disposed adjacent said one end of the pin, other means urging said pin to a position wherein said one end thereof is clear of said lever, and cam means on the trigger engaging the pin for camming said one end thereof into engagement with either of said first mentioned means upon squeezing of the trigger.

5. A reversing mechanism for use with a speed control system for a portable electric tool having a housing enclosing a series motor and supporting an operating trigger therefor, which system includes a solid state rectifier circuit including variable time delay means operated by the trigger for varying the speed of an associated series motor, said reversing mechanism comprising a reversing member mounted in said housing for movement between two opposite positions, which member has a finger engageable, exterior portion disposed adjacent said trigger so that a person's finger may simultaneously engage said trigger and said exterior portion of said member thereby to move the latter between said two positions, reversing switch means connected to said reversing member for operation of the former upon movement of the latter between said two positions.

6. A control device of the trigger actuated type adapted for mounting in a portable tool housing with the device within the housing and with the trigger extending through a housing aperture for depression by a person's trigger finger, said device comprising, a casing, a trigger movably supported thereby, a reversing member supported by said casing independently of said trigger for movement between two positions, said member having a portion thereof adapted to extend through a housing aperture, said portion being closely adjacent said trigger generally above and forwardly of the same so that a person's trigger finger may simultaneously engage said trigger and the underside of said reversing member portion, switch means including reversing means carried by said casing with said reversing means connected with said member for being actuated upon movement of the latter between said two positions, said trigger being connected with said switch means for causing a tool motor to be energized for rotation in a direction determined by the position of said member.

7. A control device of the trigger actuated type adapted for mounting in a portable tool housing with the device within the housing and with the trigger extending through a housing aperture for depression by a person's finger, said device comprising, a casing, a trigger movably supported thereby, a reversing member supported by said casing for movement between two positions, said member having a portion thereof adapted to extend through a housing aperture for manual actuation said reversing member portion being closely adjacent said trigger so that a person's trigger finger may simultaneously engage said trigger and said reversing member portion reversing switch means carried by said casing and connected with said member for being actuated upon movement of the latter between said two positions, said casing being adapted to contain the components of a speed control circuit operable in response to the amount of movement of said trigger thereby to vary the speed of an associated tool motor, said reversing switch means being adapted to be connected in said circuit so that the speed of the associated tool motor may be varied in either direction of rotation thereof.

8. A control device of the trigger actuated type adapted for mounting in a portable tool housing with the device within the housing and with the trigger extending through a housing aperture for depression by a person's trigger finger, said device comprising, a casing, a trigger movably supported thereby, a reversing arm supported by said casing independently of said trigger for movement between two positions, which arm has one end thereof disposed closely adjacent said trigger for extending through the same housing aperture which accommodates the trigger, switch means including reversing means carried by said casing with said reversing means connected with said arm for being actuated upon movement of the latter between said two positions, said trigger being connected with said switch means for causing a tool motor to be energized for rotation in a direction determined by the position of said arm.

9. A control device of the trigger actuated type adapted for mounting in a portable tool housing with the device within the housing and with the trigger extending through a housing aperture for manual depression by a person's trigger finger, said device comprising, a casing, a trigger movably supported thereby, a reversing arm supported by said casing independently of said trigger for movement between two positions, which arm has one end thereof disposed closely adjacent said trigger for engagement by an operator's trigger finger, said trigger including a cavity, a projection on said arm received within said cavity, said cavity and said projection being configured for cooperating to prevent movement of said arm except when said trigger is substantially fully extended, switch means including reversing means carried by said casing with said reversing means connected with said arm for being actuated upon movement of the latter between said two positions, said trigger being connected with said switch means for causing a tool motor to be energized for rotation in a direction determined by the position of said arm.

10. A control device of the trigger actuated type adapted for mounting in a portable tool housing with the device within the housing and with the trigger extending through a housing aperture for depression by a person's finger, said device comprising, a casing, a trigger movably supported thereby, a reversing member supported by said casing for movement between two positions, said member having a portion thereof adapted to extend through a housing aperture for manual actuation, said reversing member portion being closely adjacent said trigger so that a person's trigger finger may simultaneously engage said trigger and said reversing member portion, reversing switch means carried by said casing and connected with said member for being actuated upon movement of the latter between said two positions, said reversing switch means being adapted to be connected in a trigger controlled circuit for the motor of an associated tool, thereby to permit rotation of the motor in a direction determined by the position of said reversing member.

References Cited by the Examiner

UNITED STATES PATENTS

| 2,390,846 | 12/1945 | Obszarny | 200—157 |
| 2,744,176 | 5/1956 | Kaman | 200—61.85 |
| 3,194,898 | 7/1965 | Thomas | 200—4 |
| 3,209,228 | 9/1965 | Gawron | 318—345 |

ROBERT K. SCHAEFER, *Primary Examiner.*

H. HOHAUSER, *Assistant Examiner.*